United States Patent Office 2,893,207
Patented July 7, 1959

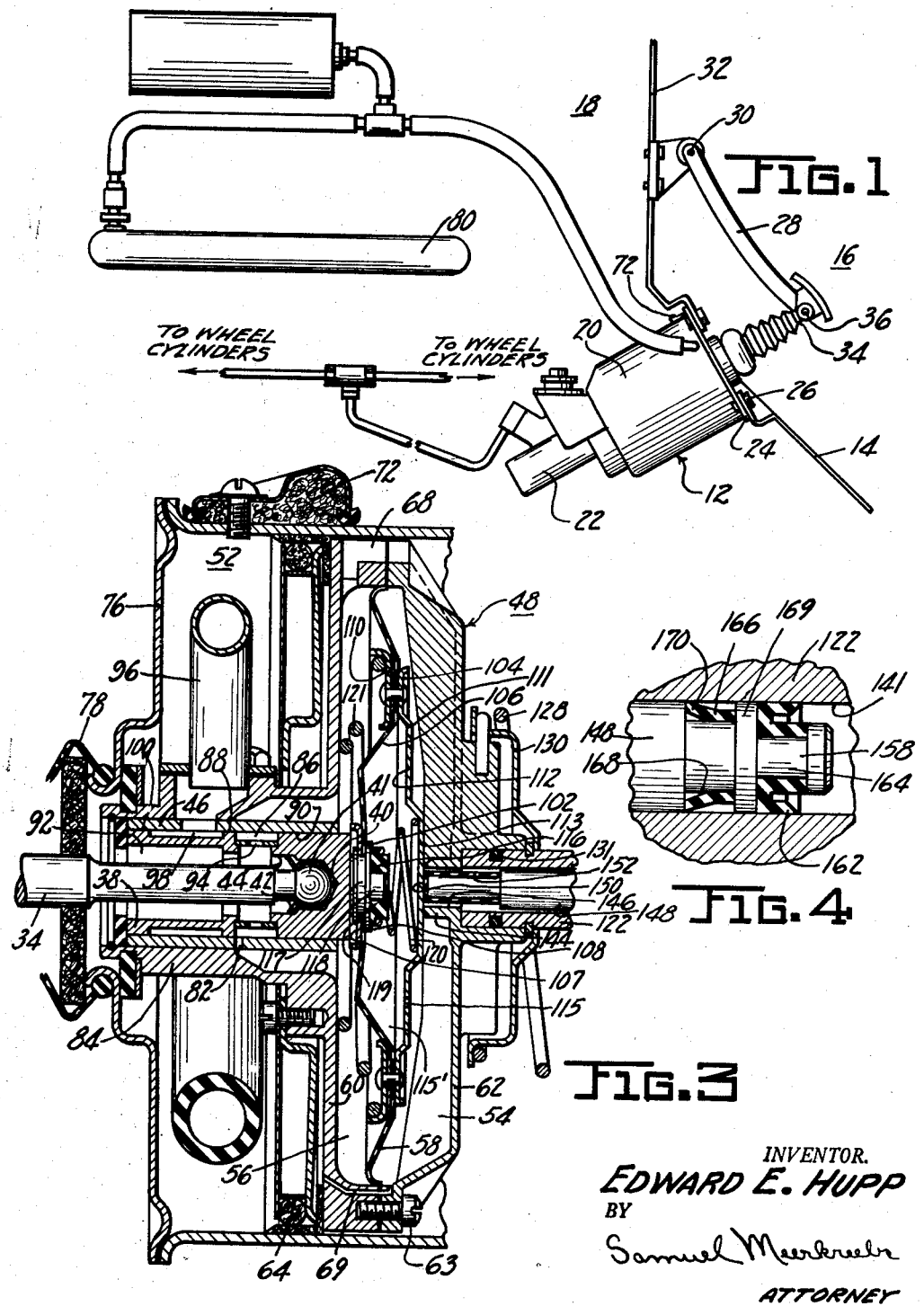

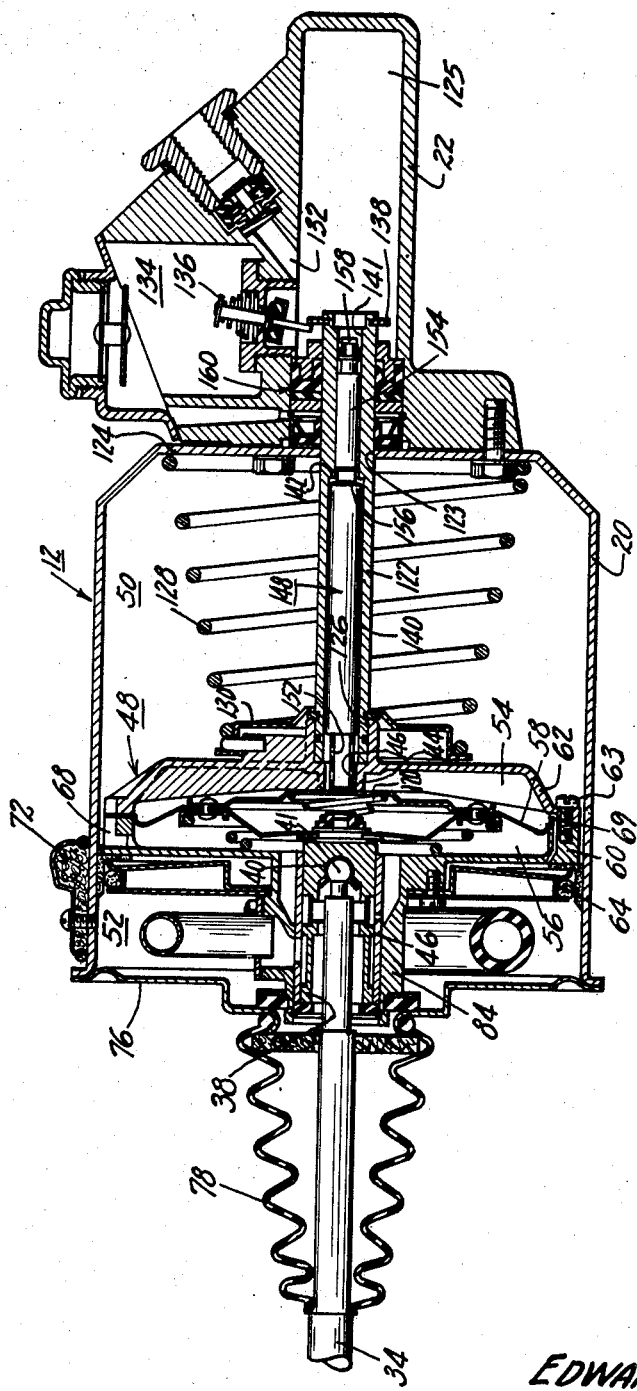

2,893,207

POWER ASSISTED ACTUATOR

Edward E. Hupp, South Bend, Ind., assignor to Bendix Aviation Corporation, South Bend, Ind., a corporation of Delaware Application October 22, 1954, Serial No. 464,099

9 Claims. (Cl. 60—54.6)

The present invention relates to a power-assisted master cylinder and more particularly to a hydraulic pressure producing device which is conjointly operated by manually actuated means and power actuated means.

In certain conventional hydraulic braking systems used on present day vehicles, the braking force delivered to the wheels is developed manually by the use of the brake pressure. In braking applications, the degree of braking effort is usually directly proportional to the amount of force exerted upon the pedal by the operator, so that a light pedal pressure will produce a relatively light deceleration while a heavier pedal pressure will produce a corresponding greater deceleration. With this arrangement, it is obvious that braking deceleration is "felt" by the operator in the form of the degree of effort the operator must exert in obtaining the deceleration. This "feel" or "reaction," as it may be called, constitutes a gauge by which a desired degree of brake actuation may be obtained, and therefore, of course, is invaluable in the proper operation of the vehicle.

In the above, so-called conventional systems, a brake pedal is operated to produce a brake application, and in operating this pedal it is well known that the operator must usually lift his foot off the accelerator and the toe-board in order to reach the pedal. Since there are certain known disadvantages in requiring this type of operator movement, such as operator fatigue and elapse of time resulting from moving from the accelerator to the brake pedal, it is deemed desirable to use a power assisted brake device which may be operated by means of a treadle (substantially the same as the accelerator treadle) whereby the operator need only swing his foot, using his heel as a pivot, from the accelerator to the brake treadle in order to apply the brakes. In changing from a pedal to a treadle operated power brake, the degree of available treadle movement in applying the brakes is deliberately made considerably less than that for a conventional pedal, whereby it becomes necessary to push harder on the treadle than on the pedal to obtain a given value of braking force. This being so, power assistance is availed of to compensate for these differences in function so that the operator will experience substantially the "feel" in the use of the treadle, that he would in the use of a pedal, and will be required to expend a relatively small amount of actual physical effort to actuate the vehicle brakes.

One principal problem which has been encountered in the use of power-assisted brake devices is the maintenance of the "feel" or "reaction" which corresponds favorably with the "feel" derived from the use of the conventional braking systems. While various expedients for providing "feel" have been proposed, and some adopted, there is a constant demand for improved operational characteristics in power-assisted brake devices which include built-in reaction features to meet the ever changing requirements of the industry for reliability, efficiency, economy, "feel," etc.

It is, therefore, a principal object of this invention to provide a power-assisted actuator for use in a vehicle braking system, which will produce desired braking torque while at the same time convey to the operator a true and pleasant indication of the degree of such braking torque. In such an arrangement, whatever resistance is offered by the brake cylinders to the pressurizing of the hydraulic fluid in the brake system, or other force transmitting medium, will be proportionally conveyed to the operator so that he "feels" the degree to which the brakes have been applied.

In accomplishment of this object, improvements over Earl R. Price's Patents Nos. 2,685,170, 2,685,171 and 2,685,172, application 411,386, filed February 2, 1954, now Patent No. 2,818,710; and my Patent 2,690,740 are presented, wherein desirable "feel" characteristics are obtained, elimination of noise characteristics occurring in these power brake devices, as well as novel seal structure in the fluid pressure cylinder of the power assisted actuator. Thus the device to be subsequently described in this application incorporates the desirable features disclosed in the above mentioned applications and yet provides still finer and positive control characteristics, and unique structural improvements.

A further object of invention is to provide novel reaction transmitting mechanism in a power-assisted actuator for use in a vehicle braking system which determines the extent to which the unit is operated, and which transmits a signal to the operator indicating the degree of actuation of the unit.

Another object is to incorporate in a power-assisted actuator for use in vehicle brake systems, compound two-stage reaction structure incorporating diaphragm reaction and hydraulic reaction for apprising the operator of the degree of brake torque resulting from brake application.

An additional object is to incorporate in a power-assisted actuator for use in a vehicle braking system, compound two-stage reaction mechanism including primary diaphragm structure for transmitting reaction during the initial application of the brakes, and a secondary diaphragm structure combined with hydraulic reaction means for transmitting reaction after the initial brake application has been made.

A further object is to utilize in a power-assisted actuator for use in a vehicle braking system, compound two-stage reaction mechanism including primary and secondary reaction means wherein the secondary reaction means is withheld from transmitting reaction during a predetermined portion of initial brake application.

Still another object is to incorporate in the power-assisted actuator for use in vehicle braking systems, a two-stage reaction structure including a primary reaction transmitting means operative to transmit reaction during the initial force of a brake application and a secondary reaction transmitting means including a diaphragm, and hydraulic reaction transmitting means subject to pressure developed in the master cylinder, for transmitting reaction subsequent to initial brake application.

Another object of the invention is to utilize in a power-assisted actuator for use in a vehicle braking system, where combined diaphragm and hydraulic reaction is transmitted to the operator during brake application, noise damping means to eliminate rough operating characteristics of the power-assisted master actuator during a brake application.

And yet another object of invention is to utilize in a power-assisted actuator for use in a vehicle braking system, wherein hydraulic reaction is transmitted to an operator to apprise him of the pressure developed in the brake system, novel seal means for preventing leakage between relatively movable parts subject to varying pressures during both braking and non-braking conditions.

Other objects and advantages of this invention will become apparent from a consideration of the following description, taken in connection with the accompanying drawings.

In the drawings:

Figure 1 is a diagrammatic illustration showing an embodiment of the power-assisted master cylinder as it is used in a vehicle braking system;

Figure 2 is a sectional view of the power-assisted master cylinder of Figure 1;

Figure 3 is an enlargement of a part of the master cylinder of Figure 2; and

Figure 4 is an enlarged view of the seal structure between the thrust rod and hydraulic reaction transmitting member.

Referring to the drawings and more particularly to Figure 1, a power-assisted master cylinder unit 12 is secured directly to the engine compartment side of the toe-board 14. The toe-board being the slanting lower portion of the firewall which separates the driver's compartment 16 from the engine compartment 18. The power-assisted master cylinder unit comprises a power cylinder 20 and a hydraulic cylinder 22 mounted on the front end of the power cylinder. The power cylinder casing has an integral mounting flange 24 which is secured by means of fastening members 26 to the toe-board or any other convenient part of the vehicle.

The power-assisted master cylinder unit 12 is controlled by a treadle 28, which is pivoted at 30 on the driver's compartment side of the firewall 32. The treadle may be pivoted at its lower end, similar to a conventional accelerator treadle, if preferred. A control rod 34 is pivotally connected at 36 to the treadle 28, and extends into the power-assisted actuator unit to cause its operation.

As shown in Figure 2, the right-hand end of rod 34 operatively engages a valve control member or plunger 38. The rod is connected to the plunger 38 by means of a C-shaped grip retainer 40 which clamps over the rounded end 41 of rod 34 and which is provided with outwardly inclined ends 42 frictionally engageable with the wall of plunger socket 44 for preventing withdrawal of said rod from said socket. The plunger 38 may be described as a slide valve which cooperates with a sleeve 46 to control pressure differential in the power assistor.

Reciprocably received in cylinder 20 is a pressure responsive movable wall or piston 48 which defines therein two variable volume chambers 50 and 52. This piston 48 is provided with an internal cavity which is divided into two compartments 54 and 56 by means of a pressure responsive diaphragm 58, and is comprised of two plates 60 and 62 which are peripherally joined together by means of a plurality of circumferentially spaced screws 63. This means of fastening the two plates together affords a convenient method of securing diaphragm 58 in position and to seal against fluid communication between compartments 54 and 56. A packing 64 is secured to the outer periphery of piston 48 to provide an air tight seal on this piston between the power chambers 50 and 52. Communication is provided between chamber 50 and compartment 56 by means of a passage 68, while communication between rear chamber 52 and front compartment 54 is provided by a passage 69 through the outer periphery of piston 48.

Although any desired type of differential fluid pressure power device may be used, I prefer to use a differential air pressure power cylinder of the vacuum type, in which the unit is "atmosphere-suspended" when released. Accordingly, chamber 52 and compartment 54 are permanently connected to the atmosphere, preferably through an integral air cleaner 72 (see Figures 1 and 2). The rear of the power cylinder could be left open, but cover plate 76 and boot 78 are used to prevent dust and dirt from getting into the interior of the power cylinder.

Valve member 38 selectively controls the communication of compartment 56 (hence also chamber 50) with either the atmosphere in chamber 52, or the vacuum source, such as the usual intake manifold 80. In the position shown, compartment 56 is connected through port 82 in sleeve 46 (which is rigidly mounted in an extension 84 provided on the rear of the piston plate 60) with an annular recess 86 formed between lands 88 and 90 of valve member 38. Recess 86 is continuously in communication with the atmosphere prevailing in the hollow center 92 of valve member 38 by means of ports 94. Vacuum is communicated to valve member 38 through a coiled rubber tube, or the like 96, which communicates through sleeve 46 into an annular chamber 98 formed between lands 88 and 100 on said valve member 38. When rod 34 is moved to the right far enough to advance land 88 of the valve member past the port 82, communication of the vacuum in annular chamber 98 is established to compartment 56.

The diaphragm 58 consists of two concentric rigid portions 102 and 104 interconnected by means of a flexible portion 106. Portion 102, which may hereafter be referred to as a primary reaction part or member, is composed of a pair of flat plates 107 and 108 which clamp therebetween the central portion of the diaphragm 58. The portion 104, which may hereafter be referred to as a secondary diaphragm reaction part or member, consisting of one annular rigid plate 110 and the outer peripheral portion 111 of an anti-flutter plate 112 which clamp therebetween the outer peripheral portion of diaphragm 58. The plate 112 is essentially flat, with a central section 113 recessed or actually offset for a purpose which will be subsequently explained. A single tiny opening 115 is provided in this plate 112 to provide fluid communication through to the primary reaction part 102 which is contained in an anti-flutter chamber 115' formed between plate 112 and diaphragm 58.

A cushioning or dampening means 116 formed in the shape of a resilient button is carried by the central part of diaphragm portion 102, said dampening means including a base portion 117 in member 107 and a stem portion 118 passing through member 108, said stem having mounted thereon a resilient button member 116, of rubber or a similar material, said button extending beyond the end of stem 118 for a purpose to be later described. The dampening means 116 is held in engagement with the right end of valve member 38 by means of a coiled spring 120 which abuts button 116 and fits into the recessed plate portion 113.

A frustro-conical spring 121 is interposed between the outer portion 104 of diaphragm 58 and the rear wall of piston 48 serving to bias said outer portion away from primary reaction portion 102. This spring 121 provides a "counter-reaction force," which prevents the combined secondary diaphragm and hydraulic reaction portions from exerting a reaction force against the operator during the initial force of the brake applying stroke, as will be subsequently described.

A pressure-transmitting member or thrust rod 122 projects through an opening 123 in the front end 124 of cylinder 20 and into pressure chamber 125 of hydraulic cylinder 22. The left end of rod 122 fits into a socket 126 centrally provided in the piston 48 on the plate 62. In order to hold the piston 48 in its illustrated released position, a coiled spring 128 is interposed between end 124 in the power cylinder 20 and a retainer ring 130 suitably secured to the left end of rod 122. Thus the force of spring 128 is transferred to piston 48 through the intermediary of the left end of rod 122. Suitable seal means 131 is provided between rod 122 and the socket 126 to prevent leakage between chamber 54 and chamber 50 when a pressure differential exists across piston 48.

The hydraulic cylinder 22 is provided with an outlet port 132 which communicates with a set of vehicle brakes, not shown. A fluid reservoir 134 is connected to the cylinder 22 via valve means 136. This valve means 136 includes a depending stem projecting into the interior of cylinder 22 where it is engaged by a radial flange member 138 carried on the right end of rod 122. In the illustrated position, the valve is unseated so that full communication is provided between the reservoir 134 and the pressure chamber 125 of cylinder 22. Moving rod 122 toward the right disengages the stem of the valve from the flange 138 permitting the valve to close, thus cutting off communication between the reservoir and the pressure chamber 125.

The rod 122 may be characterized as a volumetric plunger which, when moved to the right, will decrease the volume of the pressure chamber of cylinder 22, thereby providing a means for pressurizing hydraulic fluid in chamber 125.

Pressure-transmitting member 122 has a hollow central passage or bore 140 having a diametrically reduced bore portion 141 forming a shoulder 142. The portion of plate 62 containing socket 126 includes a portion 144 projecting into chamber 54 in proximity with plate 112 when the power device is in the position shown in Figure 2. This projecting portion 144 has the central opening 146 in axial alignment with the hollow central passage 140 of member 122. Reciprocably mounted in the passage 140 is a hydraulic reaction transmitting member 148, having one end 150 in contact with plate 112, and having interposed between end 150 and plate 112 is a noise damping member 152 mounted on member 148; the noise damping means may be composed of rubber or any similar material.

Reaction member 148 includes a stepped down portion 154 forming a shoulder 156 which cooperates with shoulder 142 of rod 122 preventing member 148 from inadvertently coming out of the central passage 140 and keeping the end 150 of the hydraulic reaction member 148 in close proximity to the plate 112.

End 158 of the hydraulic reaction member 148 is exposed to the fluid pressure existing in chamber 125 and during brake actuation will force plate 112 toward the left to transmit reaction to the operator through cushioning member 116.

Leakage of fluid from chamber 125 into chamber 50 about the portion of thrust transmitting member 122 extending into chamber 125 is prevented by a sealing assembly 160. The sealing assembly 160 also provides support structure for member 122. Leakage of fluid past the end 158 of reaction member 148 is prevented by a molded or double lip sealing member 162 mounted on a reduced end portion 164 of member 148. To prevent the leakage from chamber 54, which is generally a pressure different from that in chamber 125, through opening 146 in plate 62 and past the reaction member 148, a molded seal 166 is assembled on member 148 in a recess 168 adjacent to an annular portion 169 next to fluid seal member 162, as clearly seen in Figure 4. The seal member has a single upwardly extending edge 170 which contacts passage 140. Thus when there is pressure on this edge 170 from chamber 54 toward chamber 125, pressure on the edge of seal 166 forces it into sealing relationship with bore 141 but does not cause excessive frictional resistance when the reaction member 148 moves rearwardly to transmit reaction. The seal 166 as shown, is shaped similar to a "frustrum of a cone" wherein the smaller diameter end of the frustro-conical seal washer is assembled on member 148 adjacent the double lip seal 162 and the edge 170 of the largest diameter of the frustro-conical seal, as mentioned before, is urged against the inner bore portion 141 to effectively prevent leakage from chamber 54 to chamber 125.

As previously mentioned diaphragm portion 102, is in initial engagement with valve member 38, and will exert a definite reaction against operator effort during the initial portion of brake-applying action, which is proportional to the differential pressure prevailing over diaphragm 58. After a predetermined pressure-differential has developed, subsequent development of differential pressure on diaphragm portion 104 and development of fluid pressure in chamber 125 due to movement of thrust member 122 therein causes plate 112 to move toward the left, overcoming spring 121 and resulting in both portions 102 and 104 of the diaphragm, as well as the hydraulic reaction member 148 being effective to transmit reaction to the operator. When portion 104 moves toward the left, plate 112 abuts portion 102 and the total reaction felt by the operator will be the combination of the sum of forces produced by diaphragm portion 102, the diaphragm portion 104, and the force on hydraulic reaction member 148 due to developed hydraulic pressure in chamber 125. Thus portion 102 which acts initially, may be characterized as a primary reaction means, and since portion 104 and member 148 act subsequently they may be considered together as a secondary reaction means. In restating the above, the primary reaction portion 102 of diaphragm 58, and the secondary reaction portion 104 of diaphragm 58 and hydraulic reaction member 148, being relatively movable with respect to each other, will react separately and conjointly apprizing the operator in a predetermined manner according to the differential pressure prevailing over diaphragm 58 and the hydraulic fluid pressure developed in chamber 125. During the low initial differential pressures, only the primary reaction part 102 will react against the operator since the counter-reaction spring 121 prevents the secondary reaction members 104 and 148 from leaving their illustrated position. However, once the differential pressures developed reach a predetermined value which produces enough force on secondary reaction member 104 and the hydraulic reaction member 148 sufficient to overcome the force of spring 121, these members will move toward the left and integrate with the primary reaction part 102. After such integration, the total force acting against the operator through valve 38 and push rod 34, will be the aggregate forces exerted by the reaction parts 102, 104 and 148. Thus it is seen, that a "two-stage" reaction is provided which bears a definite relationship to the differential pressure acting on diaphragm 58 and to the hydraulic pressure developed in chamber 125. This reaction may be properly termed "two-stage" since the initial reactionary force created by the primary reaction member is small compared to the subsequent reactionary force created by the combined action of the secondary reaction members.

Operation of the power assisted actuator is as follows:

When the operator wishes to apply the brakes, he presses on treadle 28, thereby acting through rod 34 on valve member 38. Movement of the valve member toward the right causes air to be evacuated from chamber 50, thereby developing a pressure-differential over the power piston 48. The force on the power piston acts on pressure-transmitting member 122 in developing fluid pressure in cylinder 22 and in the vehicle brake cylinders. The same pressure-differential which acts on piston 48 also acts on diaphragm 58 and the fluid pressure transmitted to the vehicle brake cylinders acts on hydraulic reaction member 148. Both the pressure differential on diaphragm 58 and the fluid pressure on the hydraulic reaction member 148 are in a direction opposite to force exerted by piston 48 and thrust transmitting member 122, respectively. The force exerted by the diaphragm and by the hydraulic reaction member is proportionally related to that exerted by the power piston and thrust transmitting member.

As previously mentioned, contact between the primary reaction member 102 and the valve member 38 is continuous, and the moment the previously mentioned evacuation begins, a differential pressure will be devolped over the diaphragm 58. This differential pressure will act on the primary reaction member 102 with a force which is proportionate to its effective area. Thus, the operator experiences a "feel," or reaction from the first moment he moves treadle 28. Valve flutter is controlled by the restricted orifice 115 and chamber 115' as clearly described in my Patent 2,690,740. In obtaining the most satisfactory "feel," it is preferred that the primary reaction member 102 act during the period of force required for the brake shoes to frictionally engage the brake drums. It is further desirable that during the initial reaction stage, that the reaction force be relatively low as to correspond to the reaction force experienced by the operator of a conventional, non-power braking system in which the initial pedal travel takes up the usual shoe-to-drum clearance without the expenditure of much force. Thus by using the smaller diameter diaphragm portion there is provided the initial reaction feel, and it can be seen that a natural and true initial braking reaction can be obtained. Of course, after the brake shoes (in a conventional non-power assisted brake system) have engaged the drum, more force must be exerted on the pedal to obtain the desired degree of braking deceleration. In conforming the present invention to this force increase, at the end of the initial low-treadle-pressure stage, the pressure differential acting on the portion 104 and the fluid pressure acting on the hydraulic member 148, acting together compress spring 121 sufficiently bringing about an increased or secondary reaction "feel" acting conjointly with the primary reaction force on portion 102. This action increases the effective reaction felt by the operator on treadle 28 which is proportionately greater than the primary reaction and constitutes the second stage of the "two-stage" reaction mentioned earlier. Further increases of pressure differential in the power cylinder are accompanied by corresponding increases in reaction force acting against the operator, and which must be overcome by the operator in order to intensify the brake-applying pressure. The "two-stage" reaction described above provides a "feel" quite comparable to that encountered in the best-designed manually-operated braking systems in which the initial pedal force required to overcome the brake return springs and the normal friction of the brake parts is very light in relation to the pedal force later required to provide braking deceleration.

During brake actuation the force exerted by the operator in resisting the force of the reaction diaphragm and the pressure caused by fluid pressure chamber 125 is added to the force of the power piston, and they are combined in driving thrust rod 122 into the hydraulic pressure chamber of cylinder 22. This is true, since the reaction force of diaphragm 58 and that of hydraulic reaction member 148, when counter balanced by the force exerted by the operator, tends to drive the piston 48, toward the right on its pressure stroke, thus making it obvious that the total force tending to drive piston 48 on its pressure stroke must be the sum of the differential pressure prevailing thereover and the pressure exerted by the operator in counter balancing the diaphragm and hydraulic reactions.

The control valve has the usual follow-up action, since valve 38 slides in sleeve 46 which moves with power piston 48. As the power piston moves on its pressure stroke, it tends to overtake, and "lap" the valve control member, unless brake-applying movement of the treadle continues. Whenever the operator removes his force from the treadle, the control valve 38 is pushed back relative to piston 48, into the position in which chamber 50 communicates with the atmosphere, by reason of the force exerted by spring 120 through the button 116. Piston 48 is returned to release position by means of spring 128.

If the operator wishes to add physical force, after the full force of the power unit has been developed, or, if there is a power failure, direct force can be exerted through valve 38 and cushioning button 116 against the central recessed portion 113 of plate 112 and the portion of plate 62 which is in abutting relationship to thrust transmitting rod 122.

Cushioning button 116, as previously described, extends beyond stem 118 to provide a controlled cushioning effect when the secondary reaction members 104 and 148 move toward the left and plate 112 comes into contact with the cushioning button to transmit reaction to the operator. Thus the cushioning button 116 dampens the effect of plate 112 being urged against it until it is compressed to the extent which it no longer extends beyond stem 118, subsequent force exerted against member 116 is controlled by the stem 118 and the secondary diaphragm reaction portion 104 is prevented from contacting the inner left side of chamber 56, thus rendering the secondary diaphragm portion 104 effective for all conditions of operation.

The noise damping member 152 which is interposed between end 150 and plate 112 compensates for clearances between the end of hydraulic reaction member 148 and plate 112 and serves to prevent an excessive audible metallic click when reaction is transmitted by the hydraulic reaction member 148.

In the foregoing specification and in the appended claims, the identifying terms used are intended to convey meanings which include the range of equivalents. For example, the term "power cylinder" is intended to mean any casing or chamber having a pressure responsive movable member therein, whether such movable member be a piston, diaphragm or other construction having the same function. Either of the terms "piston" or "diaphragm" embraces a rigid piston, flexible diaphragm, or any other pressure responsive movable wall. The terms "front" and "rear" and other terms indicating a direction are intended only to have relative connotation, for convenience in describing, and are not to be interpreted as requiring any particular orientation with respect to external elements.

Although a preferred embodiment of the invention has been illustrated and described, various changes in form and relative arrangement of the parts may be made to suit requirements.

I claim:

1. A hydraulic pressure producing device, in which physical force is supplemented by power assistance, comprising a differential pressure power cylinder, a hydraulic cylinder mounted on one end of the power cylinder and having a pressure chamber which is provided with a discharge port, a fluid reservoir in communication with said hydraulic cylinder, valve means operatively associated between said reservoir and hydraulic cylinder to control fluid communication therebetween, a pressure responsive movable wall reciprocable in the power cylinder and having, a pressure-transmitting member one end of which extends into the hydraulic pressure chamber, said movable wall including two plates which are peripherally joined together and which are arranged to provide a chamber between them, a reaction diaphragm which divides said last mentioned chamber into two variable volume compartments, a first passage communicating the front compartment to the space at the rear of the movable wall, a second passage communicating the rear compartment with the space in front of the movable wall, a control valve for regulating pressure differential across said movable wall and having a control portion extending into said rear compartment, an abutment portion centrally located on said diaphragm for engaging said control member, an anti-flutter plate disposed concentrically with respect to said abutment portion and secured to said diaphragm, said plate including a center portion which is normally forwardly spaced but engageable with said abutment portion of said diaphragm, a counter reaction spring biasing said anti-flutter plate in a forward direction to normally position said plate forwardly of said abutment portion, a spring interposed between said abutment portion and said plate urging said abutment portion toward the control valve member, a bleed hole through said plate, a hydraulic reaction member reciprocable in the pressure transmitting member and having one end extending into the hydraulic cylinder and the other end being positioned to abut said plate, whereby a first effective portion of the diaphragm reacts against said control valve for all values of the differential pressure existing across the movable wall, and a second effective portion of said diaphragm and said hydraulic reaction member assist said first mentioned effective portion to transmit reaction for all values of said differential pressure above a predetermined value.

2. A hydraulic pressure producing device, in which physical force is supplemented by power assistance, comprising a differential pressure power cylinder, a hydraulic cylinder mounted on the forward end of the power cylinder and having a pressure chamber which is provided with an output pressure port, a pressure responsive movable wall reciprocable in the power cylinder and having a pressure-transmitting portion extending into the hydraulic chamber, said movable wall including two plates which are peripherally joined together and which are arranged to provide a chamber between them, a reaction diaphragm which divides said chamber into front and rear compartments, a valve control member which is operative to control differential pressure on said movable wall and reaction diaphragm, a first abutment centrally secured to said diaphragm, a second abutment the radially outer edges of which are disposed in radially spaced relation to said first abutment and secured to said diaphragm, said second abutment having a radially inwardly extending portion which is normally laterally spaced forwardly of but engageable with said first abutment, means positioned between said first and second abutments urging said first abutment toward said valve control member, a counter-reaction spring biasing said second abutment in a forward direction maintaining the aforementioned lateral spaced relation, a hydraulic reaction member reciprocable in the pressure transmitting member and having one end extending into the hydraulic cylinder and operative to be affected by hydraulic pressure therein and another end extending into the front compartment for engagement with the aforementioned inwardly extending portion of said second abutment, said counter-reaction spring biasing said second abutment and hydraulic reaction member engaged therewith in a forward direction to withhold reaction transmittal thereby until a predetermined pressure has been developed.

3. A hydraulic pressure producing device, in which physical force is supplemented by power assistance, comprising a differential pressure power cylinder, a hydraulic cylinder mounted on said power cylinder, said hydraulic cylinder including a pressure chamber and output pressure port, a pressure responsive movable wall reciprocable in the power cylinder and having a hollow pressure-transmitting portion one end of which extends into the hydraulic pressure chamber, said movable wall having a chamber therein, a reaction means dividing said chamber into two compartments, valve control means operative to control differential pressures on said movable wall and reaction means and having an operator-operated portion for actuating the same, said reaction means having first and second portions for independently applying reactive force to said operator-operated portion a counter-reaction spring biasing said second portion of said reaction means away from said operator-operated portion said first portion of said reaction means being in constant engagement with said operator-operated portion of said valve means, a second reaction means received in said hollow portion of said movable wall one end of which is subject to the pressure developed in said hydraulic cylinder and the other end of which is adapted to abut said second portion of said first reaction means, wherein the first mentioned portion of said first reaction means is effective to transmit reaction to the operator-operated portion of said valve means for all values of differential pressure existing across the movable wall, and the second portion of said first mentioned reaction means and said second reaction means are effective to transmit reaction to said operator-operated portion for all values of differential pressure above a predetermined value.

4. In a fluid pressure servo-motor driven fluid pressurizing device: a body member having an axially extending power chamber therein, a fluid pressurizing chamber housing positioned adjacent the forward end of said body member and having an internal fluid pressurizing chamber therein, a fluid displacement member projecting into said pressurizing chamber, a pressure responsive movable wall in said power chamber for moving said displacement member into said fluid pressurizing chamber to displace fluid therefrom, a control valve carried by said movable wall and having a control member therein which when moved axially in one direction causes a differential pressure to be applied across said movable wall which causes said movable wall to move in the same direction to pressurize fluid in said pressurizing chamber, said movable wall having an internal diaphragm chamber therein, first diaphragm reaction means in said diaphragm chamber for transmitting reactive force to said control member, said diaphragm means extending generally transversely to said axis and dividing said diaphragm chamber into opposing compartments, means communicating the differential pressure on said movable wall to opposite sides of said diaphragm means in a manner producing a force on said diaphragm means in a direction opposite to the pressure force on said movable wall, second reaction means subject to the pressure in said fluid pressurizing chamber for transmitting a force to said control member in said opposite direction, means providing a lost motion connection between one of said reaction means and said control member, and spring means biasing said lost motion connection to its non-force transmitting condition with generally predetermined force, whereby a compound reaction force is produced upon said control member one portion of which compound force is a direct result of the pressure differential being applied to said first movable wall and the other portion of which is a direct result of the pressure being developed in said fluid pressurizing chamber.

5. In a fluid pressure servo-motor fluid pressurizing device: a body member having an axially extending power chamber therein, a fluid pressurizing chamber housing positioned adjacent the forward end of said body member and having an internal fluid pressurizing chamber therein, a fluid displacement member projecting into said pressurizing chamber, a pressure responsive movable wall in said power chamber for moving said displacement member into said fluid pressurizing chamber to displace fluid therefrom, a control valve carried by said movable wall and having a control member therein which when moved axially in one direction causes a differential pressure to be applied across said movable wall which causes said movable wall to move in the same direction to pressurize fluid in said pressurizing chamber, said movable wall having an internal diaphragm chamber therein, a diaphragm in said diaphragm chamber extending generally transversely to said axis and dividing said diaphragm chamber into opposing compartments, means communicating the differential pressure on said movable wall to opposite sides of said diaphragm in a manner producing a force on said diaphragm in a direction opposite to the pressure force produced on said movable wall, an annular member fixed to said diaphragm to divide said diaphragm into first and second diaphragm reaction means, first means operatively connecting said first diaphragm reaction means to said control member to oppose its actuating movement, second means for transferring reactive force from said second diaphragm reaction means to said control member, said second means having a lost motion connection therein which provides a non-force transmitting condition, spring means biasing said second means to its non-force transmitting condition, and third reaction means subject to the pressure in said fluid pressurizing chamber for transmitting a force in said opposite direction to one of said diaphragm reaction means, whereby a compound reaction force is produced upon said control member one portion of which compound force is a direct result of the pressure differential being applied to said first movable wall and the other portion of which is a direct result of the pressure being developed in said fluid pressurizing chamber.

6. In a fluid pressure servo-motor driven fluid pressurizing device: a body member having an axially extending power chamber therein, a fluid pressurizing chamber housing positioned adjacent the forward end of said body member and having an internal fluid pressurizing chamber therein, a fluid displacement member projecting into said pressurizing chamber, a pressure responsive movable wall in said power chamber for moving said displacement member into said fluid pressurizing chamber to displace fluid therefrom, a control valve carried by said movable wall and having a control member therein which when moved axially in one direction causes a differential pressure to be applied across said movable wall which causes said movable wall to move in the same direction to pressurize fluid in said pressurizing chamber, said movable wall having an internal diaphragm chamber therein, a diaphragm in said diaphragm chamber extending generally transversely to said axis and dividing said diaphragm chamber into opposing compartments, means communicating the differential pressure on said movable wall to opposite sides of said diaphragm in a manner producing a force on said diaphragm in a direction opposite to the pressure force produced on said movable wall, an annular member fixed to said diaphragm to divide said diaphragm into first and second diaphragm reaction means, first means operatively connecting said first diaphragm reaction means to said control member to oppose its actuating movement, second means for transferring reactive force from said second diaphragm reaction means to said control member, said second means having a lost motion connection therein which provides a non-force transmitting condition, spring means biasing said second means to its non-force transmitting condition, and third reaction means subject to the pressure in said fluid pressurizing chamber for transmitting a force in said opposite direction to said second diaphragm reaction means, whereby a compound reaction force is produced upon said control member one portion of which compound force is a direct result of the pressure differential being applied to said first movable wall and the other portion of which is a direct result of the pressure being developed in said fluid pressurizing chamber.

7. In a fluid pressure servo-motor driven fluid pressurizing device: a body member having an axially extending power chamber therein, a fluid pressurizing chamber housing positioned adjacent the forward end of said body member and having an internal fluid pressurizing chamber therein, a fluid displacement member projecting into said pressurizing chamber, a pressure responsive movable wall in said power chamber for moving said displacement member into said fluid pressurizing chamber to displace fluid therefrom, a control valve carried by said movable wall and having a control member therein which when moved axially in one direction causes a differential pressure to be applied across said movable wall which causes said movable wall to move in the same direction to pressurize fluid in said pressurizing chamber, said movable wall having an internal diaphragm chamber therein, a diaphragm in said diaphragm chamber extending generally transversely to said axis and dividing said diaphragm chamber into opposing compartments, means communicating the differential pressure on said movable wall to opposite sides of said diaphragm in a manner producing a force on said diaphragm in a direction opposite to the pressure force produced on said movable wall, an annular member fixed to said diaphragm to divide said diaphragm into radially inner and outer portions, said inner diaphragm portion being adapted for abutting relationship with said control member, means carried by said annular member for transferring reactive force to said control member, said means having a lost motion connection therein which provides a non-force transmitting condition, spring means biasing said second means to its non-force transmitting condition, and a reaction member subject to the pressure in said fluid pressurizing chamber for transmitting a force in said opposite direction to said annular member, whereby a compound reaction force is produced upon said control member one portion of which compound force is a direct result of the pressure differential being applied to said first movable wall and the other portion of which is a direct result of the pressure being developed in said fluid pressurizing chamber.

8. In a fluid pressure servo-motor driven fluid pressurizing device: a body member having an axially extending power chamber therein, a fluid pressurizing chamber housing positioned adjacent the forward end of said body member and having an internal fluid pressurizing chamber therein, a fluid displacement member extending into said pressurizing chamber, a pressure responsive movable wall in said power chamber for moving said displacement member into said fluid pressurizing chamber to displace fluid therefrom, a control valve carried by said movable wall and having a control member therein which moved axially in one direction causes a differential pressure to be applied across said movable wall to cause it to move in the same direction and pressurize fluid in said pressurizing chamber, said movable wall having an internal diaphragm chamber therein, a diaphragm in said diaphragm chamber extending generally transversely to said axis and dividing said diaphragm chamber to opposing compartments, means communicating the differential pressure on said movable wall to opposite sides of said diaphragm in a manner producing a force on said diaphragm in a direction opposite to the pressure force produced on said movable wall, an axially positioned generally circular plate the outer edges of which are sealed to the forward face of said diaphragm to divide said diaphragm into radially inner and radially outer portions, said inner diaphragm portion being adapted for abutting relationship with said control member, said plate having a bleed hole therethrough and being adapted to abut the center portion of said diaphragm for transmitting force to said control member, spring means biasing said plate forwardly out of engagement with said center portion of said diaphragm, and a reaction member one end of which is subject to the pressure in said fluid pressurizing chamber the other end of which is adapted to abut said plate for transmitting a reactive force to said control member, whereby compound reaction forces are produced upon said control member one portion of which compound force is a direct result of the pressure differential being applied to said diaphragm and the other portion of which is a direct result of pressure being developed in said fluid pressurizing chamber.

9. In a fluid pressure servo-motor driven fluid pressurizing device: a body member having an axially extending power chamber therein, a fluid pressurizing chamber axially positioned adjacent the forward end of said body member, a pressure responsive movable wall in said power chamber and having a portion extending into said fluid pressurizing chamber to displace fluid therefrom, a control valve carried by said movable wall and having a control member therein which when moved axially forwardly causes a differential pressure to be applied across said movable wall which biases said movable wall in a forward direction, said movable wall having a diaphragm chamber therein communicating with said control member, the diaphragm in said diaphragm chamber dividing said diaphragm chamber into forward and rearwardly positioned compartments, means communicating said rearwardly positioned compartment to the forward face of said movable wall and communicating said forwardly positioned compartment to the rear face of said movable wall, a generally axial positioned plate the circumferential edges of which are sealed to the forward face of said diaphragm to divide said diaphragm into radially inner and radially outward portions, said radially inner portion of said diaphragm being adapted to abut said control member, and said plate being adapted to abut said center portion of said diaphragm, spring means biasing said plate forwardly out of engagement with said center portion of said diaphragm, and a reaction member carried by said portion of said movable wall extending into said fluid pressurizing chamber the forward end of which is subject to the pressure in said fluid pressurizing chamber and the rearwardly positioned end of which is adapted to abut said plate, whereby reactive force is applied to said control member in first and second stages the second stage of which is the combined effect of a force which is a direct result of the pressure differential being applied to said movable wall and another force which is a direct result of the pressure being developed in said fluid pressurizing chamber.

References Cited in the file of this patent

UNITED STATES PATENTS

| | | |
|---|---|---|
| 119,852 | Johnson | Oct. 10, 1871 |
| 1,215,445 | Waller | Feb. 13, 1917 |
| 2,006,487 | Sorensen | July 2, 1935 |
| 2,458,803 | Stelzer | Jan. 11, 1949 |
| 2,532,422 | Richardson | Dec. 5, 1950 |
| 2,532,960 | Stelzer | Dec. 5, 1950 |
| 2,685,170 | Price | Aug. 3, 1954 |
| 2,690,740 | Hupp | Oct. 5, 1954 |